United States Patent Office 3,459,740
Patented Aug. 5, 1969

3,459,740
STEROIDO-OXAZOLINES WITH PHARMA-
COLOGICAL ACTIVITY
Giangiacomo Nathansohn and Giorgio Winters, Milan,
Italy, and Emilio Testa, Vacallo, Tessin, Switzerland,
assignors to Lepetit S.p.A., Milan, Italy
No Drawing. Filed Dec. 30, 1966, Ser. No. 605,984
Int. Cl. C07c 173/10, 173/00; A61k 27/00
U.S. Cl. 260—239.55     4 Claims

---

ABSTRACT OF THE DISCLOSURE 1,4-pregnadiene-16,17-oxazolines having chlorine at the 11-position and chlorine or bromine at the 9-position, are prepared by treating 1,4,9(11)-pregnatriene-16,17-oxazolines with chlorine in the presence of pyridine, or with an N-haloamide of an aliphatic monocarboxylic acid or an N-haloimide of an aliphatic dicarboxylic acid together with hydrogen halide in the presence of lithium chloride in a solvent. The compounds have antiinflammatory and hormone-like activity.

---

This invention is concerned with new steroids and a process for the preparation thereof. More particularly, the compounds with which this invention is concerned are steroido-oxazolines of the formula

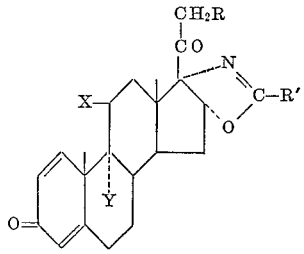

wherein R represents hydrogen, hydroxy or an acyloxy group, R' represents hydrogen, lower alkyl groups or phenyl, and X and Y are halogen atoms.

The compounds of this invention possess antiinflammatory and hormone-like activity which is higher than that of the analogous 9,11-dihalogenated steroid already used in therapy (9α,11β-dichloro-17α,21-dihydroxy-1,4-pregnadiene-3,20-dione). This superior activity was ascertained by pharmacological tests on animals, which revealed a degree of activity many times superior to that of the known compound under identical conditions.

The process for the preparation of the steroido-oxazolines herein described and claimed starts from a pregna-1,4,9(11)-triene-[17α,16α-d]-oxazoline of the formula

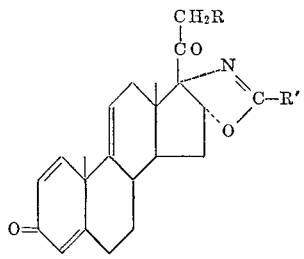

wherein R and R' have the above significance, which is treated either with chlorine in the presence of pyridine or with an agent selected from N-haloimides of aliphatic monocarboxylic acids and N-haloimides of aliphatic dicarboxylic acids together with a hydrogen halide in the presence of lithium chloride in a solvent.

The starting pregna-1,4,9(11)-triene is in turn prepared using as starting compounds the steroids described and claimed in our copending application Ser. No. 538,574 of Mar. 30, 1966, through a series of steps which all are generally used in steroid chemistry. The appended examples, besides giving in detail the general process described hereinbelow, also describe the steps for the preparation of the starting pregna-1,4,9(11)-trienes.

Generally speaking, these steps comprise the conversion of a 5α-pregnane-3β,11β-diol-20-one-[17α,16α-d]-oxazoline 3β-acylate of the formula

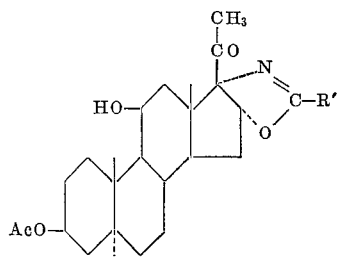

into the desired pregna-1,4,9(11)-triene through the formation of the following intermediate compounds, when the end compound has to bear a 21-hydroxy or 21-acyloxy group:

5α-pregn-9(11)-ene-3β-ol-20-one-[17α,16α-d]-oxazoline
  3β-acylate
5α-pregn-9(11)-ene-3β-ol-20-one-[17α,16α-d]-oxazoline
5α-pregn-9(11)-ene-3β,21-diol-20-one-[17a,16α-d]-oxazoline 21-acylate
5α-pregn-9(11)-ene-21-ol-3,20-dione-[17α,16α-d]-oxazoline 21acylate
pregn-9(11)-ene-2,4-dibromo-21-ol-3,20-dione-
  [17α,16α-d]-oxazoline 21-acylate
pregna-1,4,9(11)-triene-21-ol-3,20-dione-[17α,16α-d]-
  oxazoline 21-acylate As will be obvious to those skilled in the art, when no 21-hydroxy or 21-acyloxy group has to be present in the end compound, some steps of the above indicated preparation are to be omitted. The intermediate compounds will then be as follows:

5α-pregn-9(11)-ene-3β-ol-20-one-[17α,16α-d]-oxazoline
5α-pregn-9(11)-ene-3,20-dione-[17α,16α-d]-oxazoline
pregn-9(11)-ene-2,4-dibromo-3,20-dione-[17α,16α-d]-
  oxazoline
pregna-1,4,9(11)-triene-3,20-dione-[17a,16α-d]-oxazoline These preparations of the starting pregna-1,4,9(11)-trienes are given for the purpose of exemplification only, since obvious modifications of the preparation are within the skill of chemists familiar with this art. It is, for instance, possible to introduce the 21-acyloxy group after a 21-non-oxygenated pregna-1,4,9(11)-triene-3,20-dione as been prepared according to the above described procedures. It is in any case apparent that the pregna-1,4,9(11)-trienes are the key intermediates for the preparation of the compounds of the present invention.

The following examples are given for the purpose of illustration only, and are not intended as indicative of the limits of the invention.

EXAMPLE 1

Pregna-1,4-diene-9α,11β-dichloro-21-ol-3,20-dione-
  [17α,16α-d]-2'-butyloxazoline 21-acetate An amount of 1 g. of pregna-1,4,9(11)-triene-21-ol-3,20-dione-[17α,16α-d]-2'-butyloxazoline 21-acetate, is dissolved in 40 ml. of chloroform containing 5 ml. of pyridine. Through this solution chlorine is bubbled at 0° C. for 30 seconds. Stirring is prolonged for 30 minutes, then the mixture is diluted with 100 ml. of methylene chloride and washed with aqueous 2% sodium thiosulfate, then with dilute sulfuric acid and water. The obtained product is chromatographically purified on silicagel (20 g.) using a mixture of benzene:ethyl acetate (9:1) as the eluting solvent, thus obtaining 0.6 g. of $9\alpha,11\beta$-dichloro-derivative, which crystallizes from acetone-hexane, M.P. 158–160° C., $[\alpha]_D+104.6°$ (c. 0.5, $CHCl_3$).

PREPARATION OF THE STARTING COMPOUND (1) $5\alpha$-pregnane - $3\beta,11\beta$ - diol-20-one-$[17\alpha,16\alpha$-d$]$-2'-butyloxazoline.—An amount of 115 g. of $5\alpha$-pregnane-$3\beta$-ol-11,20-dione-$[17\alpha,16\alpha$-d$]$-2'-butyloxazoline 3-valerate is dissolved in methanol and the solution is heated to boiling temperatures; 540 ml. of water, 62.2 ml. of pyridine and 88 g. of semicarbazide hydrochloride are then added. The mixture is refluxed for 5 hours, then, after evaporation of methanol, it is poured into 3500 ml. of water. A precipitate is formed: it is the 20-semicarbazide derivative, which weighs 117 g. and has M.P. 229–232° C., $[\alpha]_D+43.2°$ (c. 0.5, $CHCl_3$). Sixty grams of the above compound dissolved in 1200 ml. of ethanol are heated at 60–70° C. and to this solution another solution of 18.8 g. of $KHCO_3$ in 18.8 ml. of water is added under a nitrogen stream. Then 14.4 g. of sodium borohydride are carefully added to the boiling mixture. After boiling for 90 minutes the mixture is cooled and its pH is made neutral with 10% acetic acid. Ethanol is distilled off, water is added and an extraction is carried out with chloroform. The product is scarcely soluble in chloroform, so that at last it crystallizes out; weight 58 g., M.P. 235–238° C. It is the 11$\beta$-hydroxy derivative. A solution of this product (22 g.) in 220 ml. of methanol and 220 ml. of 10% hydrochloric acid is refluxed for 90 minutes. Ethanol is then distilled off and the resulting solution is cooled and made alkaline with 10% sodium hydroxide. An amount of 21 g. of $5\alpha$-pregnane-$3\beta,11\beta$-diol-20-one-$[17\alpha,16\alpha$-d$]$-2'-butyloxazoline is obtained, M.P. 120–125° C.

(2) $5\alpha$-pregnane - $3\beta,11\beta$ - diol-20-one-$[17\alpha,16\alpha$-d$]$-2'-butyloxazoline 3-acetate.—A mixture of 28.2 g. of $5\alpha$-pregnane - $3\beta,11\beta$ - diol - 20-one-$[17\alpha,16\alpha$-d$]$-2'-butyloxazoline, 100 ml. of pyridine and 28.2 ml. of acetic anhydride is heated on a water bath for 45 minutes. The mixture is then poured into ice-water containing 100 ml. of concentrated hydrochloric acid. A precipitate is formed, which is repeatedly washed with water and dried. The aqueous solution is chromatographically purified using silicagel and benzene containing 5% of acetone as eluting solvent. By evaporation of the solvent another amount of product is obtained: total yield 22 g., M.P. 143–145° C., $[\alpha]_D+60.6$ (c. 0.5%, $CHCl_3$).

(3) $5\alpha$-pregn-9(11)-ene-$3\beta$-ol-20-one-$[17\alpha,16\alpha$-d$]$-2'-butyloxazoline 3-acetate.—An amount of 17.34 g. of $5\alpha$-pregnane - $3\beta,11\beta$ - diol-20-one-$[17\alpha,16\alpha$-d$]$-2'-butyloxazoline 3-acetate is dissolved in 93.2 ml. of dimethylformamide and 30.9 ml. of collidine. To this solution are added 10.45 ml. of methanesulphonic acid chloride at a temperature of 10° C., then 8.4 ml. of dimethylformamide containing $SO_2$ (6% b.w.). The temperature is now allowed to rise up to 35° C.; the mixture is stirred for 10 minutes, then it is cooled and poured into 1000 ml. of ice-water containing 10 g. of sodium acetate. An extraction is made with $CHCl_3$ and the obtained solution is dried over sodium sulfate, it is filtered and the solvent is removed. The oily product thus obtained weighs 17.79 g. and is $5\alpha$-pregn-9(11)-ene-$3\beta$-ol-20-one-$[17\alpha,16\alpha$-d$]$-2'-butyloxazoline 3-acetate.

(4) $5\alpha$ - pregn-9(11)-ene-$3\beta$-ol-20-one-$[17\alpha,16\alpha$-d$]$-2'-butyloxazoline.—An amount of 17.79 g. of $5\alpha$-pregn-9(11)-ene-$3\beta$-ol-20-one - $[17\alpha,16\alpha$-d$]$ - 2' - butyloxazoline 3-acetate dissolved in 300 ml. of methanol are heated to reflux, then a solution of 4.86 g. of KOH in 80 ml. of water is added. The mixture is allowed to boil for 10 minutes, then the organic solvent is distilled off and the resulting solution is neutralized with $CH_3COOH$. After extraction with chloroform and evaporation of the solvent the residue is taken up with ethanol and precipitated by diluting with water. Yield 14 g., M.P. 90–93°, $[\alpha]_D+48.6$ (c. 0.5%, $CHCl_3$).

(5) $5\alpha$-pregn-9(11)-ene-$3\beta,21$-diol-20-one-$[17\alpha,16\alpha$-d$]$-2'-butyloxazoline 21-acetate.—To a quantity of 9.74 g. of $5\alpha$ - pregn - 9(11) - ene-$3\beta$-ol-20-one-$[17\alpha,16\alpha$-d$]$-2'-butyloxazoline dissolved in 290 ml. of chloroform, 19.5 ml. of a solution of 24% hydrobromic acid in acetic acid and 4.15 g. of bromine in 39 ml. of $CHCl_3$ are added. The mixture is then made neutral with sodium bicarbonate, the chloroform layer is separated to dryness in vacuo. The residue is the 21-bromo derivative, and it is dissolved in 48 ml. of acetone which is added to a boiling solution of the following composition: triethylamine 79.5 ml., acetone 79.5 ml., glacial acetic acid 48 ml. After 1 hour's refluxing the organic solvent is removed in vacuo and 200 ml. of water are added. The product is extracted with chloroform and crystallized from isopropl-ether: it is the 21-acetate, weight 7.79 g., M.P. 176–179° C., $[\alpha]_D+10.7$ (c. 0.5%, $CHCl_3$).

(6) $5\alpha$-pregn-9(11)-ene-21-ol-3,20-dione-$[17\alpha,16\alpha$-d$]$-2'-butyloxazoline 21-acetate.—A solution of 30 g. of $5\alpha$-pregn - 9(11) - ene - $3\beta,21$ - diol-20-one-$[17\alpha,16\alpha$-d$]$-2'-butyloxazoline 21-acetate in 1300 ml. of acetone is oxidized at room temperature by a volume of 20 ml. of a solution of 8 N chromic acid in sulfuric acid. The mixture is then diluted with 1500 ml. of ice-water, and almost all the organic solvent is evaporated off. An extraction with chloroform, which is subsequently removed, yields a product which is taken up with diethyl ether. By evaporating the solvent 16.65 g. of the 3-oxo-derivative are obtained, M.P. 170–174° C., $[\alpha]_D+27.2$ (c. 0.5%, $CHCl_3$).

(7) Pregna - 1,4,9(11) - triene-21-ol-3,20-dione-$[17\alpha,16\alpha$-d$]$-2'-butyloxazoline 21-acetate.—A solution of 8.36 g. of $5\alpha$-pregn-9(11) - ene - 21 - ol - 3,20 - dione - $[17\alpha,16\alpha$-d$]$-2'-butyloxazoline 21-acetate in 110 ml. of dioxane, containing 8.36 ml. of a solution of 24% hydrobromic acid in acetic acid, is reacted within 60 minutes with 5.68 g. of bromine dissolved in 57 ml. of acetic acid. The mixture is allowed to stand for 45 minutes, then it is poured into 1000 ml. of water containing potassium acetate (35 g.), and filtered, thus obtaining 10.7 g. of 2,4-dibromoderivative. This compound is dissolved in 42 ml. of dimethylformamide, and added to a suspension of 3.15 g. of lithium bromide and 6.36 g. of lithium carbonate in 87 ml. of dimethylformamide, stirred and heated to 130° C. under nitrogen stream for 4 hours, then it is cooled and poured into ice-water. An extraction with chloroform yields the required compound whichis recrystallized from acetone-hexane; its weight is 8 g., M.P. 127–131° C. $[\alpha]_D-37.9$ (c. 0.5, $CHCl_3$).

EXAMPLE 2

Pregna-1,4-diene-$9\alpha,11\beta$-dichloro-21-ol-3,20-dione-$[17\alpha,16\alpha$-d$]$-2'-methyloxazoline and 21-acetate An amount of 2 g. of pregna-1,4,9(11)-triene-21-ol-3,20-dione-$[17\alpha,16\alpha$-d$]$-2'-methyloxazoline 21-acetate is dissolved in 85 ml. of glacial acetic acid. To this solution 7.5 g. of anhydrous lithium chloride and, after cooling to 5° C., 0.685 g. of N-chlorosuccinimide and 2 ml. of tetrahydrofuran containing 0.185 g. of hydrogen chloride are added. After maintaining for 2.5 hours at room temperature, the mixture is poured into 700 ml. of water. The crystalline product was collected on filter and crystallized from acetone-hexane; it is pregna-1,4-diene-$9\alpha,11\beta$-dichloro-21-ol-3,20-dione-$[17\alpha,16\alpha$-d$]$ - 2' - methyloxazoline 21-acetate. The obtained product weighs 1.7 g. (yield 75%), M.P. 215–118° C.

An amount of 1 g. of this product is dissolved in 50 ml. of methanol containing 1.3 ml. of 70% perchloric acid and 20 ml. of tetrahydrofuran. After stirring for 16 hours at room temperature the product is made to separate by dilution with water; then it is collected on filter, washed and recrystallized from acetone, thus being obtained 0.67 g. (yield 75%) of the required pregna-1,4-diene-9α,11β-dichloro-21-ol - 3,20 - dione-[17α,16α-d]-2'-methyloxazoline, M.P. 211–214° C.

Preparation of the starting compound

An amount of pregna-1,4-diene-11β-ol-3,20-dione-[17α,16α-d]-2'-methyloxazoline dissolved in 23 ml. of dimethylformamide and 7.5 ml. of collidine. Then 2.5 ml. of methanesulfonic acid chloride are dropped into the stirred mixture, previously cooled to 10° C. Two and one half milliliters of dimethylformamide containing $SO_2$ (5% B.W.) are added dropwise at the same temperature, then the solution is warmed to 20° C. The temperature is maintained at 30–33° C. After 10 minutes the temperature is lowered and maintained between 10 and 20° C., and 4.5 ml. of water are added dropwise. The mixture is then poured into 250 ml. of ice water containing 5 g. of sodium acetate. The product is extracted with methylene chloride, this solution is dehydrated and the solvent is distilled off. The residue is pregna-1,4,9(11)-triene-3,20-dione-[17α,16α-d]-2'-methyloxazoline, yield 2.77 g. (71%), M.P. 249–252° C. The above compound (3.3 g. is dissolved in 24.8 ml. of anhydrous tetrahydrofuran and 24.8 ml. of methanol. To this mixture 5 g. of calcium oxide and 0.160 g. of α,α'-azo-bis-isobutyronitrile are added under strong stirring. At the temperature of 25° C. some drops of a solution containing 3.3 g. of iodine dissolved in a mixture of 16 ml. of tetrahydrofuran and 10 ml. of methanol are added. After about half an hour the reaction starts and iodine is absorbed: then the remaining iodine solution is added dropwise at 10° C. Fifteen minutes after the end of the addition 200 ml. of methylene chloride are added, the mixture is filtered and the residue is well washed with methylene chloride on the filter. The filtrate is washed with a very cold 25% solution of sodium thiosulfate in water, then with water. The solution is dried and the solvent is distilled off. The obtained solid residue is dissolved in acetone (19 ml.), then this solution is added to a warm (50° C.) and stirred mixture prepared by adding after cooling 18.3 ml. of glacial acetic acid to a mixture of 30 ml. of acetone in 30 ml. of triethylamine. This solution is boiled for half an hour, then the organic solvents are evaporated in vacuo and the residue is taken up with 100 ml. of water. The crude product is crystallized from methanol yielding 2.5 g. of pregna-1,4,9(11)-triene-21-ol-3,20-dione-[17α,16α-d] - 2' - methyloxazoline 21-acetate.

EXAMPLE 3

Pregna-1,4-diene-9α-bromo-11β-chloro-21-ol-3,20-dione-[17α,16α-d]-2'-methyloxazoline 21-acetate To a solution of 2 g. of pregna-1,4,9(11)-triene-21-ol-3,20-dione-[17α,16α-d]-2' - methyloxazoline 21-acetate in 85 ml. of glacial acetic acid, 7.5 g. of anhydrous lithium chloride and, after cooling to 0–5° C., 0.720 g. of N-boromoacetamide and 2 ml. of tetrayhdrofuran containing 0.185 mg. of HCl are added. The mixture is stirred for 3 hours at room temperature, then it is poured into 700 ml. of ice-water. The precipitate collected on filter and crystallized from acetone gives 1.58 g. (yield 70%) of pregna-1,4-diene-9α-bromo-11β-chloro-21-ol-3,20-dione-[17α,16α-d]-2'-methyloxazoline 21-acetate, M.P. 185–187° C.

EXAMPLE 4

Pregna-1,4-diene-9α,11β-dichloro-21-ol-3,20-dione-[17α,16α-d]-2'-methyloxazoline An amount of 2 g. of pregna-1,4,9(11)-triene-3,20-dione-[17α,16α-d]-2'-methyloxazoline is dissolved in 80 ml. of chloroform containing 10 ml. of pyridine. Through this solution chlorine is bubbled at 0° C. for half a minute. The reaction vessel is then shaken for 30 minutes at room temperature, then the mixture is diluted with 200 ml. of methylene chlorine and washed with 2% sodium thiosulfate, dilute sulfuric acid and sodium bicarbonate. The solvent is evaporated and the residue is recrystallized from absolute alcohol. An amount of 1.85 g. of the dichloro derivative is obtained, M.P. 183–184° C., (yield 77%), $[α]_D+13.8$ ($CHCl_3$).

EXAMPLE 5

Pregna-1,4-diene-9α,11β-dichloro-21-ol-3,20-dione-[17α,16α-d]-oxazoline and 21-acetate An amount of 2 g. of pregna-1,4,9(11)-triene-21-ol-3,20-dione-[17α,16α-d]-oxazoline 21-acetate is dissolved in 80 ml. of chloroform containing 10 ml. of pyridine. Chlorine is bubbled in at 0° C. for 20 seconds and the reaction vessel is shaken for 30 minutes. The mixture is then treated as indicated in the preceding example, obtaining 1.8 g. of the 9α,11β-dichloro derivative, M.P. 186–188° C.

We claim.

1. A steroido-oxazoline of the formula

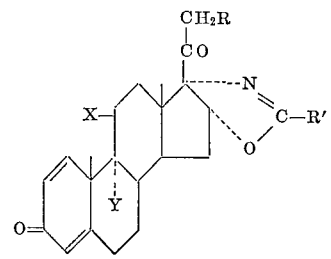

wherein R is a member of the class consisting of hydrogen, hydroxy and acyloxy, R' is a member of the class consisting of hydrogen, lower alkyl and phenyl, X is chlorine and Y is a member of the class consisting of chlorine and bromine.

2. A compound as in claim 1, wherein the steroido-oxazoline is pregna-1,4-diene-9α,11β-dichloro-21-ol-3,20-dione-[17α,16α-d]-2'-butyloxazoline.

3. A compound as in claim 1, wherein the steroido-oxazoline is pregna-1,4-diene-9α,11β-dichloro-21-ol-3,20-dione-[17α,16α-d]-2'-methyloxazoline.

4. A compound as in claim 1, wherein the steroido-oxazoline is pregna-1,4-diene-9α,11β-dichloro-21-ol-3,20-dione-[17α,16α-d]-2'-methyloxazoline.

References Cited

UNITED STATES PATENTS 3,009,938  11/1961  Gould et al. _____ 260—397.45

OTHER REFERENCES

Winternitz et al., Steroids, December 1965, pp. 805–840, p. 811 relied on or pertinent.

LEWIS GOTTS, Primary Examiner
ETHEL G. LOVE, Assistant Examiner

U.S. Cl. X.R.

260—999